United States Patent
Kodama

(10) Patent No.: US 9,992,363 B2
(45) Date of Patent: Jun. 5, 2018

(54) IMAGE PROCESSING APPARATUS AND NON-TRANSITORY COMPUTER READABLE MEDIUM

(71) Applicant: FUJI XEROX CO., LTD., Tokyo (JP)

(72) Inventor: Mari Kodama, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days. days.

(21) Appl. No.: 14/953,628

(22) Filed: Nov. 30, 2015

(65) Prior Publication Data

US 2016/0080593 A1    Mar. 17, 2016

Related U.S. Application Data

(63) Continuation of application No. 14/109,248, filed on Dec. 17, 2013, now Pat. No. 9,232,096.

(30) Foreign Application Priority Data

Jun. 18, 2013  (JP) ................................ 2013-127317

(51) Int. Cl.
 *H04N 1/00* (2006.01)
 *G06F 3/12* (2006.01)

(52) U.S. Cl.
 CPC ....... *H04N 1/00477* (2013.01); *G06F 3/1222* (2013.01); *G06F 3/1238* (2013.01);
 (Continued)

(58) Field of Classification Search
 CPC ............ H04N 1/00477; H04N 1/00514; G06F 3/1222; G06F 3/1238; G06F 3/1267; G06F 3/1288
 See application file for complete search history.

(56) References Cited

U.S. PATENT DOCUMENTS 8,659,779 B2    2/2014 Hashimoto
2003/0072031 A1*  4/2003 Kuwata .............. H04N 1/00137
                                             358/1.15
(Continued)

FOREIGN PATENT DOCUMENTS

JP        05-276400 A    10/1993
JP     2005-339508 A    12/2005
(Continued)

OTHER PUBLICATIONS

Communication dated Jul. 21, 2016 from the Japanese Patent Office in counterpart Japanese application No. 2013-127317.
(Continued)

*Primary Examiner* — Iriana Cruz
(74) *Attorney, Agent, or Firm* — Sughrue Mion, PLLC

(57) ABSTRACT

An image processing apparatus is provided. The apparatus includes a display controller that controls, for a piece of processing information stored in a memory and that is not concealed, to display details of the piece of processing information on a display, controls, for a piece of processing information stored in the memory and that is concealed, to not display details of the piece of processing information but to indicate a presence of the piece of processing information on the display, and controls to display details of both concealed and non-concealed pieces of processing information on the display, for a user that has been identified as an administrator. The display controller receives a request to delete a piece of processing information that is stored in the memory and that is selected by the user that has been identified as the administrator, even if the piece of processing information is concealed.

16 Claims, 9 Drawing Sheets

(52) U.S. Cl.
CPC .......... *G06F 3/1267* (2013.01); *G06F 3/1288* (2013.01); *H04N 1/00514* (2013.01)

(56) References Cited

U.S. PATENT DOCUMENTS

| | | | |
|---|---|---|---|
| 2005/0243363 A1* | 11/2005 | Muto | G06F 3/1207 358/1.15 |
| 2007/0025589 A1 | 2/2007 | Okamoto et al. | |
| 2007/0106668 A1* | 5/2007 | Maegawa | G06F 21/34 |
| 2007/0133033 A1* | 6/2007 | Mizutani | G06F 21/608 358/1.14 |
| 2012/0050790 A1* | 3/2012 | Hong | H04N 1/00225 358/1.15 |
| 2014/0211240 A1* | 7/2014 | Maki | G06K 15/4095 358/1.14 |

FOREIGN PATENT DOCUMENTS

| | | |
|---|---|---|
| JP | 2006-309721 A | 11/2006 |
| JP | 2007-115192 A | 5/2007 |
| JP | 2007-237685 A | 9/2007 |
| JP | 2008020936 A | 1/2008 |
| WO | 2006043562 A1 | 4/2006 |

OTHER PUBLICATIONS

Communication dated Sep. 28, 2017, from the Japanese Patent Office in counterpart application No. 2016-245044.

* cited by examiner

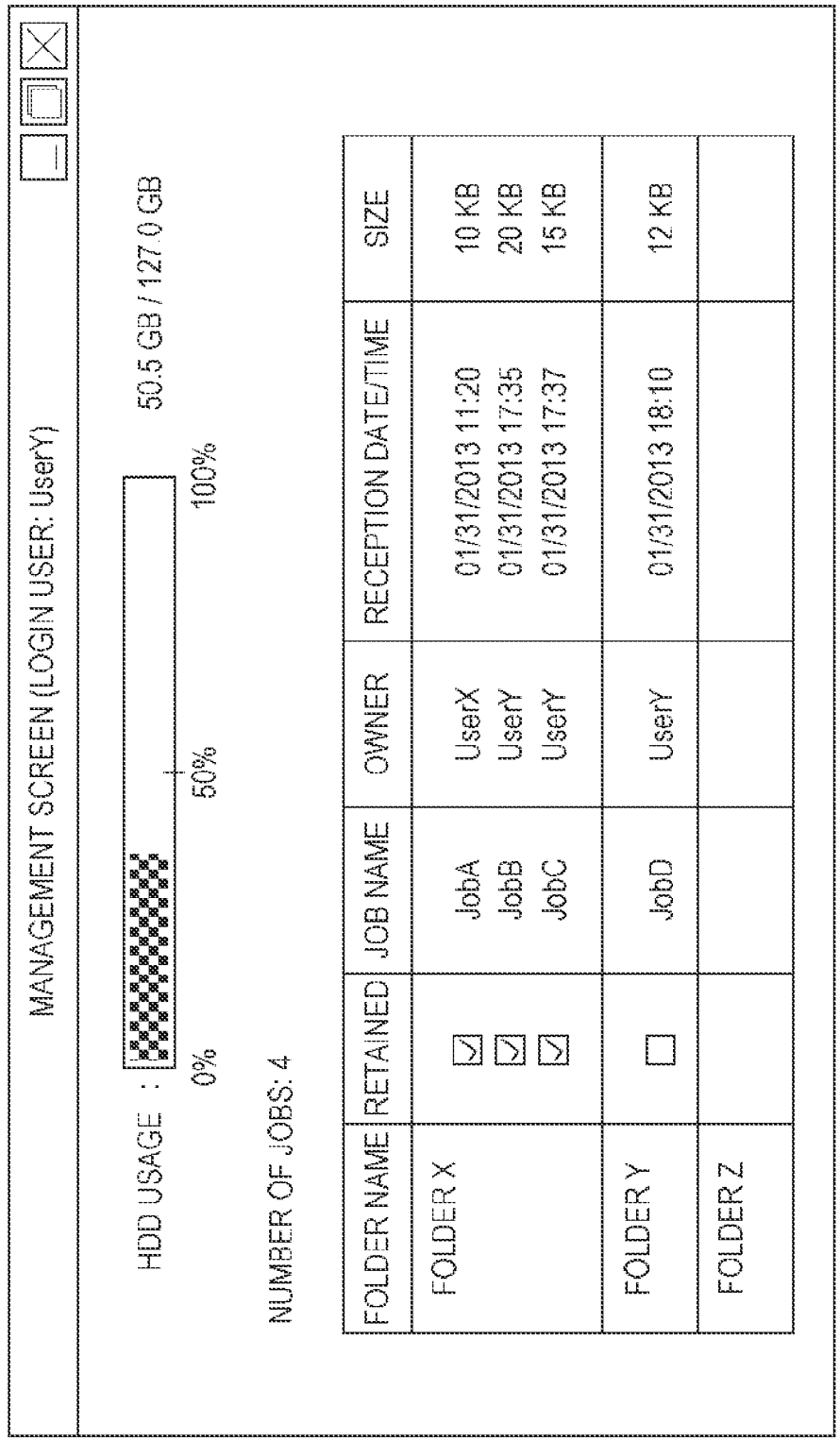

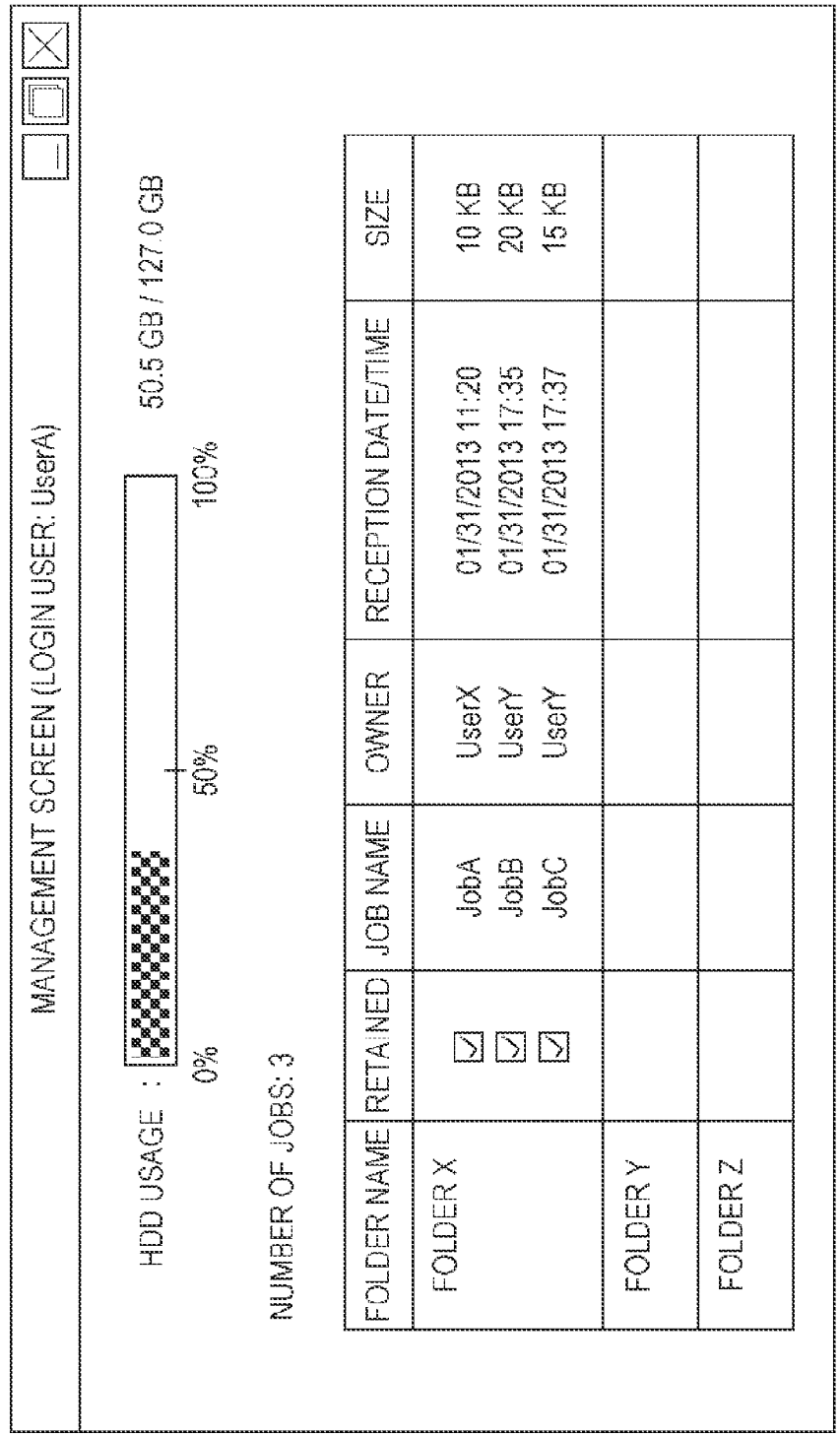

IMAGE PROCESSING APPARATUS AND NON-TRANSITORY COMPUTER READABLE MEDIUM

CROSS-REFERENCE TO RELATED APPLICATIONS

This application is a Continuation of U.S. patent application Ser. No. 14/109,248, filed on Jul. 23, 2013, which claims priority from Japanese Patent Application No. 2013-127317 filed Jun. 18, 2013, the contents of all of which are incorporated herein by reference in their entirety.

BACKGROUND

Technical Field

The present invention relates to an image processing apparatus and a non-transitory computer readable medium.

SUMMARY

According to an aspect of the invention, there is provided an image processing apparatus including a memory and a display controller. The memory memorizes pieces of processing information. The display controller performs control, for a piece of processing information that has been memorized by the memory and that is not concealed, so as to display the details of the piece of processing information on a display. The display controller performs control, for a piece of processing information that has been memorized by the memory and that is concealed, so as not to display the details of the piece of processing information but so as to indicate only the presence of the piece of processing information on the display.

BRIEF DESCRIPTION OF THE DRAWINGS

An exemplary embodiment of the present invention will be described in detail based on the following figures, wherein:

FIGS. 6A and 6B are schematic diagrams illustrating display screens, which are comparative examples of display in accordance with control performed by the display control unit, FIG. 6A illustrating a management screen displayed in the case where a user identified as UserY views the management screen, FIG. 6B illustrating a management screen displayed in the case where a user identified as UserA views the management screen;

DETAILED DESCRIPTION

An exemplary embodiment of the present invention will be described below in detail with reference to the drawings.

Figure 1:
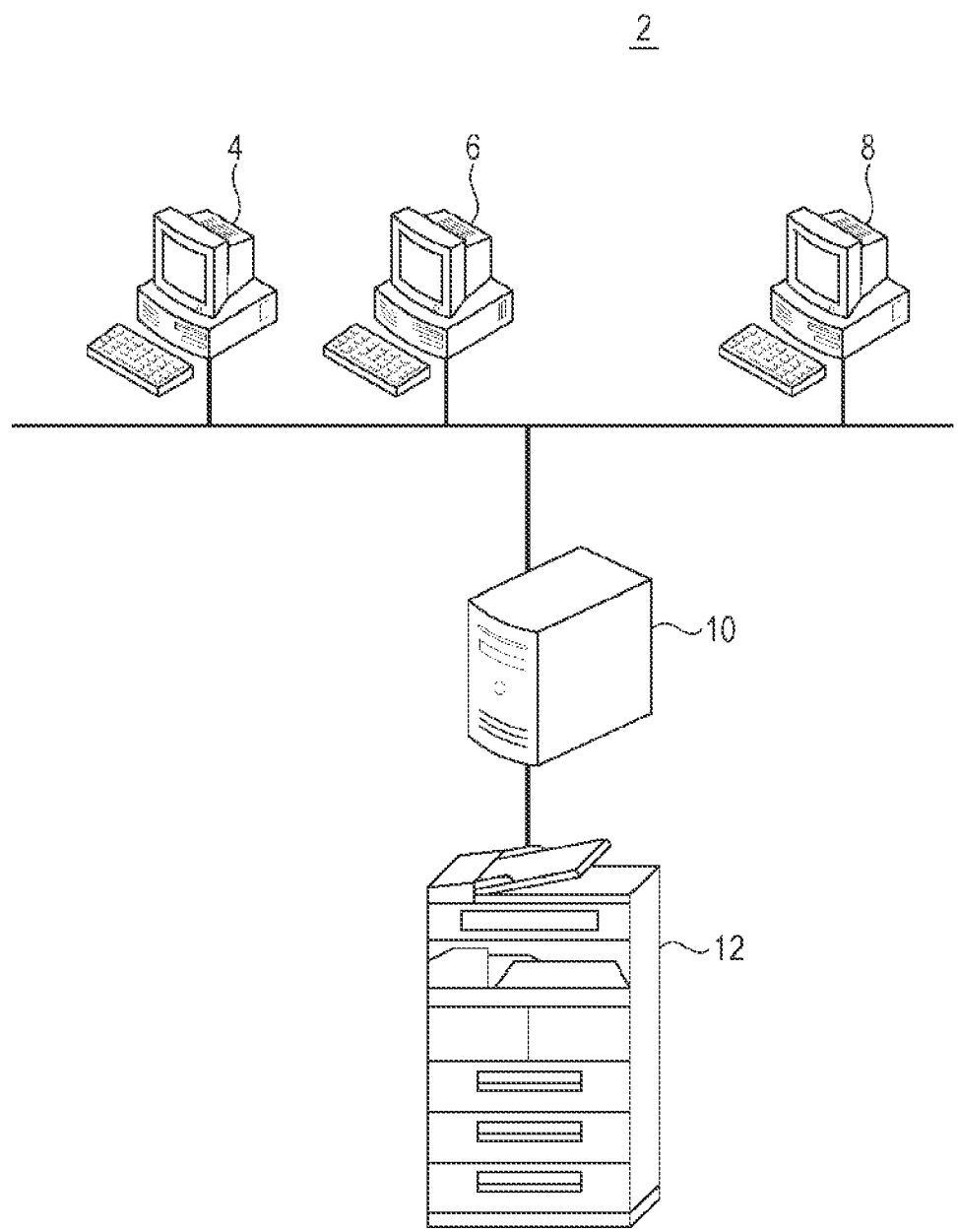
FIG. 1 is a schematic diagram illustrating an example of the configuration of an image processing system according to an exemplary embodiment of the invention.

FIG. 1 is a schematic diagram illustrating an example of the configuration of an image processing system 2 according to an exemplary embodiment of the invention. As illustrated in FIG. 1, the image processing system 2 of the exemplary embodiment of the invention is constituted by terminal apparatuses 4, 6, and 8, which are personal computers or the like, an image processing apparatus 10 that is connected to the terminal apparatuses 4, 6, and 8 over a network, and an image forming apparatus 12 that is connected to the image processing apparatus 10 over a network.

Note that, in the example illustrated in FIG. 1, three terminal apparatuses and one image forming apparatus are illustrated, however, the number of terminal apparatuses and the number of image forming apparatuses may each be any number that is equal to or larger than 1.

The terminal apparatus 4, 6, or 8 transmits a job (processing information), such as a print job, to the image processing apparatus 10. A job transmitted by the terminal apparatus 4, 6, or 8 is transmitted as either an authentication job or a general job. An authentication job is a job that is set so that the job is handled while concealed from a user other than an authenticated user who has performed an operation of generating the job. A general job is a job that is not set to be concealed and handled.

For example, when printing of a certain document is to be performed, in the case where a user does not want another user to know the details of a print job, such as the name of the user that has printed the document, the content of the document that has been printed, or the number of print copies, the user sets the print job as an authentication job.

The image processing apparatus 10 memorizes a job received from the terminal apparatus 4, 6, or 8, performs image processing in accordance with the memorized job, and transmits image data that has been subjected to image processing to the image forming apparatus 12. The image forming apparatus 12 outputs an image based on the image data that has been received from the image processing apparatus 10 on a sheet.

Here, the image forming apparatus 12 may be a multi-function machine that has plural functions, such as a print function, a scan function, a copy function, and a facsimile function, or may be a single-function printer that has a print function only. The image processing apparatus 10 memorizes a job relating to a function that the image forming apparatus 12 has. For example, in the case where the image forming apparatus 12 has a facsimile function, the image processing apparatus 10 memorizes a job relating to facsimile transmission, performs image processing for facsimile transmission in accordance with the memorized job, and outputs resulting image data to the image forming apparatus 12.

Note that, in the exemplary embodiment, a description is given under the assumption that a job memorized by the image processing apparatus 10 is a job transmitted from the terminal apparatus 4, 6, or 8. However, the image processing apparatus 10 may read and memorize a job that is stored in a portable storage medium connected to the image processing apparatus 10 or may memorize a job generated by the image processing apparatus 10.

Figure 2:
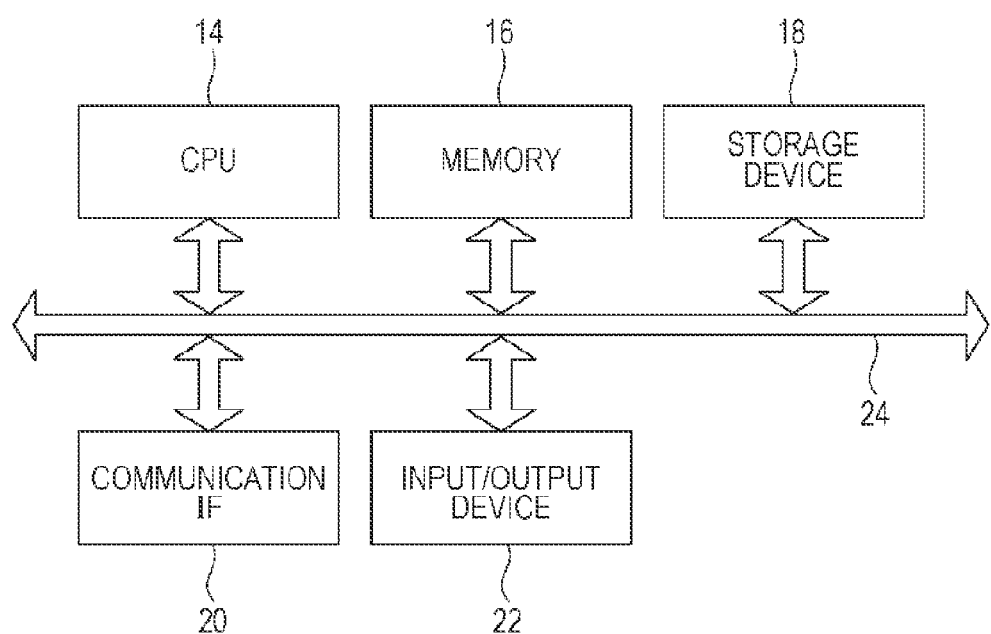
FIG. 2 is a block diagram illustrating the hardware configuration of an image processing apparatus in the image processing system of the exemplary embodiment.

FIG. 2 is a block diagram illustrating the hardware configuration of the image processing apparatus 10 in the image processing system 2 of the exemplary embodiment.

As illustrated in FIG. 2, the image processing apparatus 10 has a central processing unit (CPU) 14, a memory 16, a storage device 18, such as a hard disk drive (HDD), a communication interface (IF) 20 for transmitting/receiving data to/from an external apparatus, such as the terminal apparatus 4, 6, or 8 or the image forming apparatus 12, over a network, and an input/output device 22. These components are connected to one another via a control bus 24.

The CPU 14 performs processing in accordance with a program stored in the memory 16 or the storage device 18 and controls operations of the image processing apparatus 10.

Note that, in the exemplary embodiment, a description is given under the assumption that the CPU 14 reads and executes a program stored in the memory 16 or the storage device 18. However, the program may be stored in a storage medium, such as a compact disc read-only memory (CD-ROM), and provided to the CPU 14 therefrom or the program may be provided via the communication IF 20.

The input/output device 22 is a device serving as a display device, which is a display unit that displays information, and as an input accepting device that accepts input made by an operator. In the exemplary embodiment, the input/output device 22 is constituted by a touch panel and a card reader that reads information in a recording medium, such as an integrated circuit (IC) card. Note that, as a matter of course, examples of the input/output device 22 are not limited to touch panels and the input/output device 22 may be constituted by a display apparatus and an input device, such as a keyboard.

Figure 3:
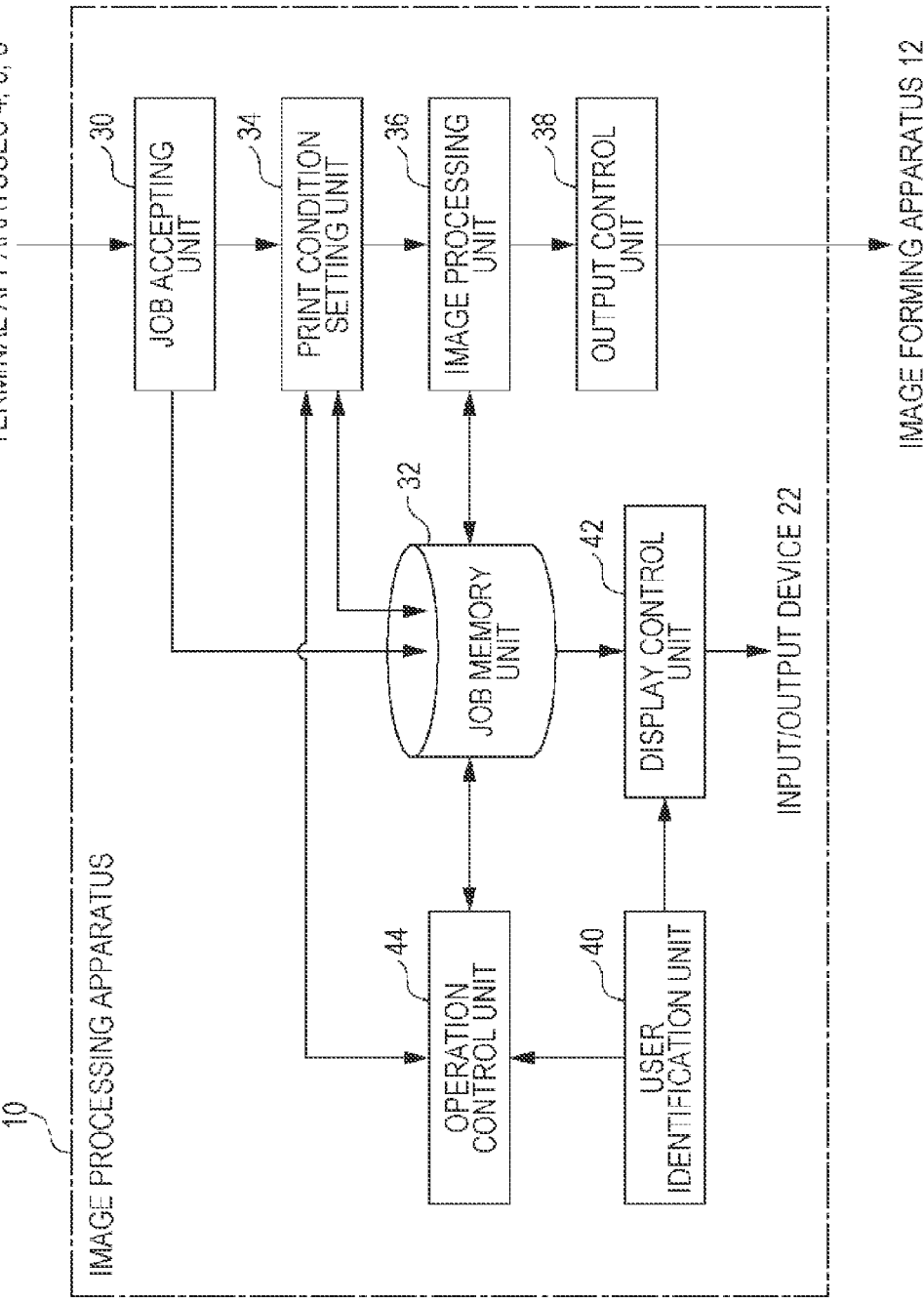
FIG. 3 is a block diagram illustrating the functional configuration of the image processing apparatus implemented by executing a program.

FIG. 3 is a block diagram illustrating the functional configuration of the image processing apparatus 10 implemented by executing a program.

As illustrated in FIG. 3, the image processing apparatus 10 has a job accepting unit 30, a job memory unit 32, a print condition setting unit 34, an image processing unit 36, an output control unit 38, a user identification unit 40, a display control unit 42, and an operation control unit 44.

The job accepting unit 30 accepts data of a print job from the terminal apparatus 4, 6, or 8. The job accepting unit 30 may accept data of a job from an apparatus other than the terminal apparatuses 4, 6, and 8 as described above. In the case where the image forming apparatus 12 has a function other than a print function as in a multi-function machine, the job accepting unit 30 may accept, in addition to data of a print job, data of a job relating to the function that the image forming apparatus 12 has.

The job memory unit 32 memorizes data of a job that has been accepted by the job accepting unit 30. In the exemplary embodiment, the job memory unit 32 stores a job in a folder (storage location) determined in accordance with a predetermined setting to thereby memorize the job. The predetermined setting provides a storage location corresponding to a job and may be configured as desired. The predetermined setting may be configured so that, for example, a job is stored, in accordance with what type of job it is, in a folder corresponding to the job type, a job is stored, in accordance with a user who has performed an operation of generating the job, in a folder corresponding to the user, or a job is stored, in the case where data of the job includes information that specifies a storage location, in the specified storage location.

The print condition setting unit 34 sets print conditions, such as the number of copies, print density, and the size of a sheet that is an output destination, for a print job memorized by the job memory unit 32. In the exemplary embodiment, the print condition setting unit 34 sets, under the control of the operation control unit 44 described below, print conditions on the basis of an operation performed by a user. Note that the print condition setting unit 34 may set print conditions so as to make a change to print conditions that have already been set for a job accepted by the job accepting unit 30.

The image processing unit 36 performs predetermined image processing on image data for printing that is included in data of a print job memorized by the job memory unit 32. Note that, in the case where the image forming apparatus 12 has a function other than a print function as in a multi-function machine, for example, the image processing unit 36 may perform image processing corresponding to the function that the image forming apparatus 12 has.

The output control unit 38 performs control so that image data that has been subjected to image processing performed by the image processing unit 36 is outputted to the image forming apparatus 12 for printout on a sheet. Note that, in the case where the image forming apparatus 12 has a function other than a print function as in a multi-function machine, for example, the output control unit 38 may perform control so that output corresponding to the function that the image forming apparatus 12 has is performed.

The user identification unit 40 identifies a user who performs an operation on the image processing apparatus 10. In the exemplary embodiment, the user identification unit 40 identifies a user on the basis of identification information that has been obtained via the input/output device 22. For example, the user identification unit 40 may obtain identification information of a user by obtaining read information in a recording medium, such as an IC card, via the input/output device 22 or may obtain identification information provided by an input operation that has been accepted by the input/output device 22.

In the exemplary embodiment, a user identified by the user identification unit 40 is managed so as to be identified as any one of a general user, an administrator, and a special administrator. The administrator is a user who is responsible for administration of the image processing apparatus 10, for example, and is given privileges in terms of operation authority, which a general user is not given. The administrator is given operation authority to delete a folder in which no job is stored, delete a general job of another user, or move a general job of another user to a different storage location, for example. The special administrator is given higher operation authority than the administrator, such as operation authority to view the details of an authentication job of another user, for example. Note that the special administrator may be given authority to delete an authentication job of another user.

The display control unit 42 controls display of data of a job memorized by the job memory unit 32. Note that, in the exemplary embodiment, a description is given under the assumption that the display control unit 42 performs control on display information to be displayed on the input/output device 22. However, the display control unit 42 may perform control so as to display information on a display unit other than a display unit that the image processing apparatus 10 has. For example, the display control unit 42 may be configured to display information on a display device included in a terminal apparatus that is connected to the image processing apparatus 10 over a network.

Specifically, the display control unit 42 performs control, for a job that has been memorized by the job memory unit 32 and that is not concealed, so as to display the details of the job and, for a job that has been memorized by the job memory unit 32 and that is concealed, so as not to display the details of the job but so as to indicate only the presence of the job. In the exemplary embodiment, a general job is a job that is not concealed and therefore the details of the job are displayed. On the other hand, for an authentication job, it is determined, in accordance with a viewing user, whether the job is a job that is concealed from the viewer or a job that is not concealed from the viewer. For example, an authentication job is handled as a job that is not concealed from a creator (owner) of the job and a special administrator while being handled as a job that is concealed from a user other than those described above. Note that the details of display performed by the display control unit 42 are described below.

The operation control unit 44 controls an operation performed by a user on a job memorized by the job memory unit 32. An operation may be performed by a user via the input/output device 22 or by using another terminal apparatus, such as the terminal apparatus 4, 6, or 8.

The operation control unit 44 not only controls an operation performed by a user on setting of print conditions described above but also controls an operation of deleting a job memorized by the job memory unit 32 and an operation of changing a storage location of a job. Specifically, in the case where an operator identified by the user identification unit 40 has operation authority over an operation target job memorized by the job memory unit 32, the operation control unit 44 accepts an operation on the job. In the case where an operator identified by the user identification unit 40 does not have operation authority over an operation target job memorized by the job memory unit 32, the operation control unit 44 does not accept but rejects an operation on the job. Note that the details of determination on whether or not operation authority is given are described below.

Next, the details of display performed by the display control unit 42 are described below.

Figure 4:
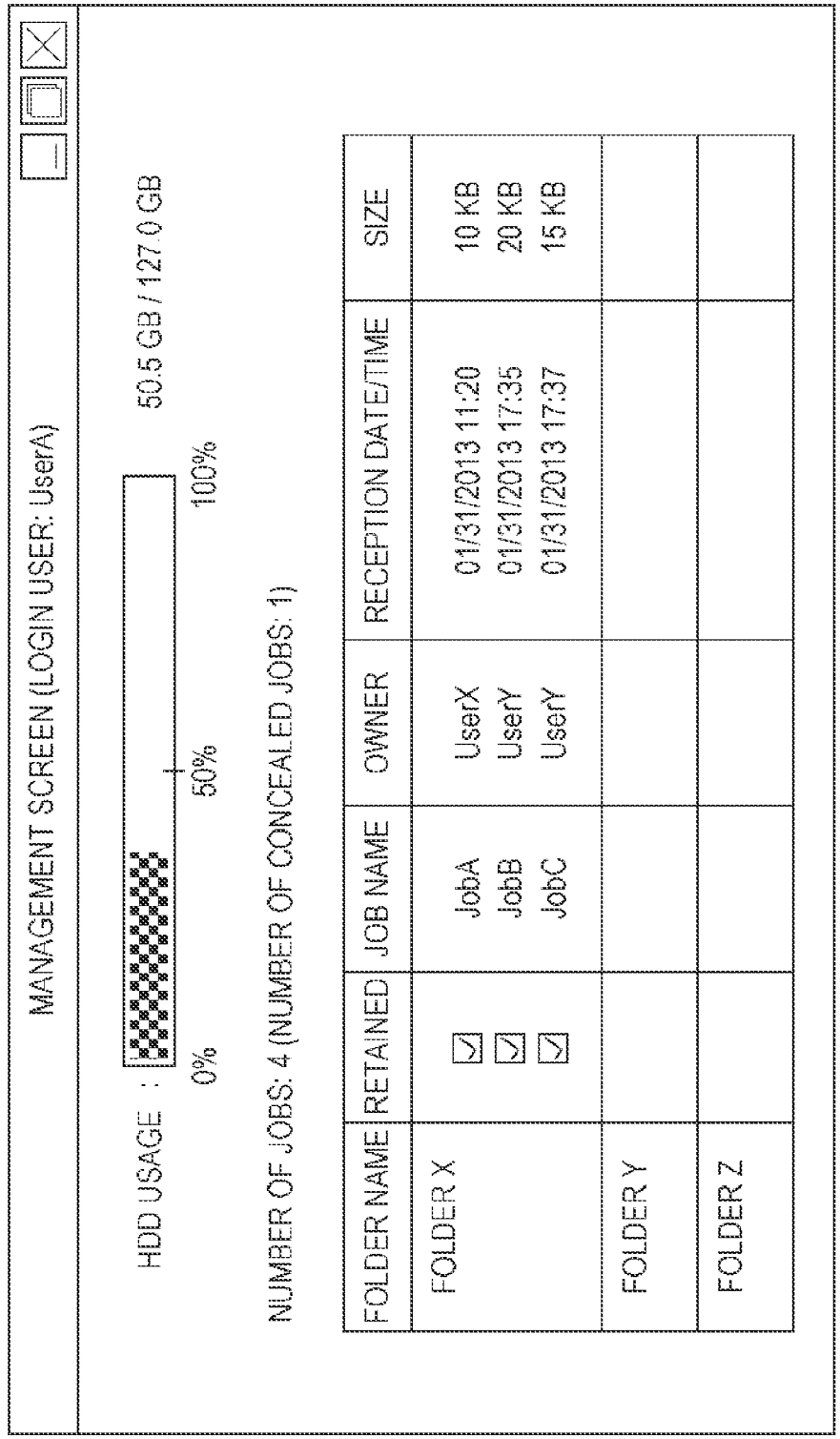
FIG. 4 is a schematic diagram illustrating an example of a management screen displayed in accordance with display control performed by a display control unit.

FIG. 4 is a schematic diagram illustrating an example of a management screen displayed in accordance with display control performed by the display control unit 42. Here, an example of a case where a user identified by the user identification unit 40 as UserA views a management screen is described. The user UserA is a user who is not a special administrator. In the management screen illustrated in FIG. 4, the usage state of the storage capacity of the storage device 18 that memorizes data of jobs and a list of memorized jobs are displayed.

As storage locations of jobs, a folder X, a folder Y, and a folder Z are provided. In the folder X, three jobs, namely, JobA, JobB, and JobC, are stored. Here, the jobs JobA, JobB, and JobC are general jobs. Although not illustrated in FIG. 4, a job JobD, which is an authentication job, is stored in the folder Y. Here, it is assumed that a user (owner) who has performed an operation of creating the authentication job JobD is a user UserY, not the user UserA. In this case, the authentication job JobD is a job that is concealed from the user UserA. The folder Z is an empty folder. Note that, in FIG. 4, the general jobs and the authentication job are stored in the respective folders, however, a general job and an authentication job may be mixed in one folder.

As illustrated in FIG. 4, for the general jobs JobA, JobB, and JobC, the details of the jobs are displayed, such as the folder in which the jobs are stored, whether or not each of the jobs is a job that is specified to be retained, the names of the owners of the jobs, the reception date/time of the jobs, and the data size of the jobs. Note that retaining of a job is a setting in order to specify that, after processing on a job has been completed, the job memory unit 32 does not delete data of the job but keeps memorizing the data. The retaining of a job is set by an operation performed by a user, for example. In the case of a print job, for example, in the case where a user desires to change the number of print copies and perform printing again on a print job after printing in accordance with the print job has been completed, the user performs setting so as to retain the job.

As described above, the display control unit 42 performs control so as to display the details of a job that is not concealed, such as a general job. On the other hand, the display control unit 42 performs control so as not to display the details of the job JobD that is concealed from the user UserA but so as to indicate only the presence of the job JobD. In the example illustrated in FIG. 4, as an indication of the presence of a concealed job, the number of concealed jobs ("1" in FIG. 4) is displayed. In the example illustrated in FIG. 4, the total number of memorized jobs ("4" in FIG. 4) is also displayed.

Figure 5:
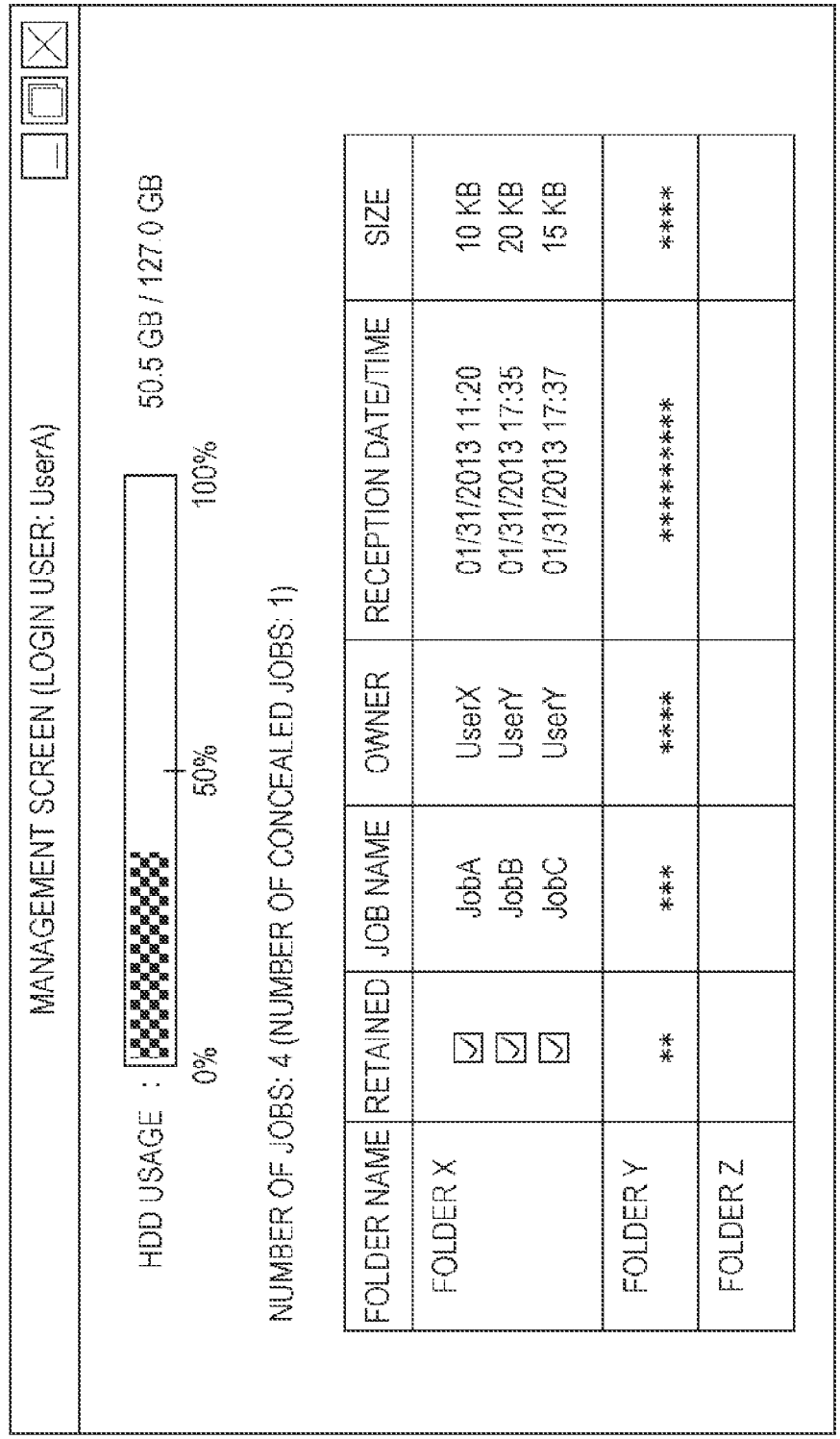
FIG. 5 is a schematic diagram illustrating another example of the management screen displayed in accordance with display control performed by the display control unit.

Note that it is sufficient that the presence of a concealed job be known and therefore the display control unit 42 may perform control so as to display only the total number of memorized jobs. In this case, the details of three jobs are displayed while the total number of memorized jobs is four and therefore a user recognizes that a concealed job is present. The number of jobs may be displayed for each folder. In the example illustrated in FIG. 4, the presence of a concealed job is indicated by displaying the number of concealed jobs, however, a simple indication of the presence/absence of a concealed job may be displayed. Also in this case, the presence/absence of a concealed job may be indicated for each folder. For example, as illustrated in FIG. 5, a concealed job may be indicated by using a predetermined character that replaces descriptions of the details of the job so as to make the details unknown.

Next, a description is given of comparative examples of the display described above. FIGS. 6A and 6B are schematic diagrams illustrating display screens, which are comparative examples of display in accordance with control performed by the display control unit 42 according to the exemplary embodiment. FIG. 6A illustrates a management screen displayed in the case where a user identified as UserY views the management screen while FIG. 6B illustrates a management screen displayed in the case where a user identified as UserA views the management screen. Note that FIGS. 6A and 6B illustrate management screens displayed in the case where the same jobs as those described with reference to FIG. 4 are memorized.

The management screen illustrated in FIG. 6A is a management screen displayed in the case where the user UserY, who is an owner of the authentication job JobD, views the management screen and therefore the details of the authentication job JobD are also displayed in the management screen in addition to the details of the general jobs. As the display of the number of jobs, "4" is displayed, which is the number of jobs, the details thereof being displayed.

On the other hand, the management screen illustrated in FIG. 6B is a management screen displayed in the case where the user UserA, not the user UserY who is an owner of the authentication job JobD, views the management screen. Therefore, the details of the general jobs are displayed but the details of the authentication job JobD, which is concealed from the user UserA, are not displayed. As the display of the number of jobs, "3" is displayed, which is the number of jobs, the details thereof being displayed, and the authentication job JobD is not counted in the number of jobs. In this case, the user UserA recognizes that the number of jobs that are present is three from displayed information, however, the number of jobs actually memorized is four, resulting in an inconsistency. Note that, also in FIG. 6A, in the case where an authentication job of a user UserZ, not the user UserY who is a viewer, has been memorized, the details of the authentication job of the user UserZ are not displayed and the number of jobs displayed does not count the authentication job in the management screen for the user UserY, resulting in a similar inconsistency.

In the case where the inconsistency described above arises, when a large number of jobs, the presence of which is not recognized, are memorized in accordance with the setting of retaining a job described above, for example, the storage capacity is exhausted before a user becomes aware of the exhaustion, which may result in a situation where a new job is unable to be memorized. Another situation may arise where, in the case where an administrator recognizes a folder to be empty, in which a concealed job is present, and attempts an operation of deleting the folder, the deletion operation of the folder fails because of the concealed job. As described above, maintainability may be affected.

On the other hand, in the display control performed by the display control unit 42 as described with reference to FIG. 4, confidentiality of a concealed job may be maintained while the presence thereof may be recognized by other users.

Next, operations performed in order to display a management screen of the exemplary embodiment are described.

Figure 7:
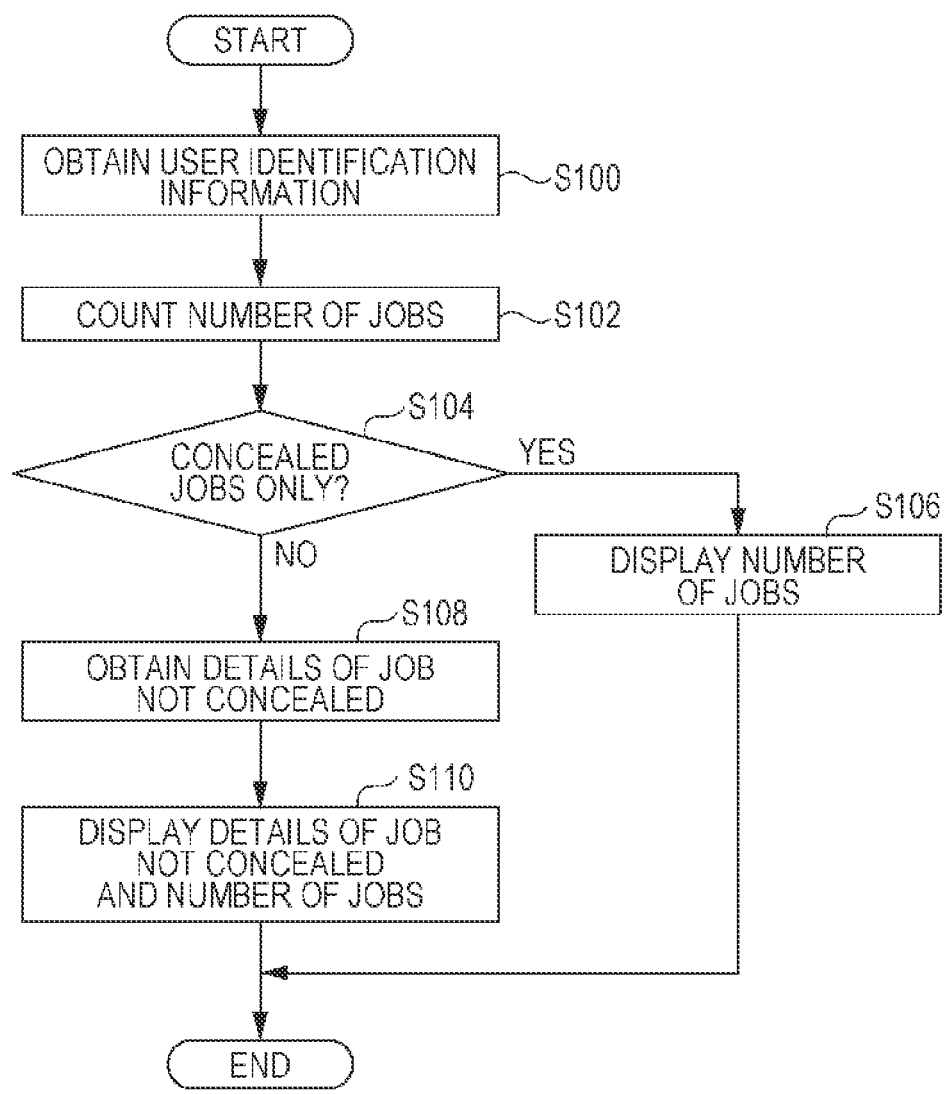
FIG. 7 is a flow chart illustrating an example of operations performed in the image processing apparatus.

FIG. 7 is a flow chart illustrating an example of operations performed in the image processing apparatus 10.

In step S100, the user identification unit 40 identifies a user who views a management screen by obtaining identification information of the user via the input/output device 22.

In step S102, the display control unit 42 counts the number of general jobs and authentication jobs memorized by the job memory unit 32. Here, the display control unit 42 counts a general job as a job that is not concealed. For an authentication job, the display control unit 42 determines whether or not the authentication job is a concealed job on the basis of the result of the identification performed in step S100.

Specifically, in the case where the user identified in step S100 is a special administrator, any authentication job is counted as a job that is not concealed from the user identified in step S100. In the case where the user identified in step S100 is not a special administrator, if an owner of an authentication job is the user identified in step S100, the authentication job is counted as a job that is not concealed from the user identified in step S100. If an owner of an authentication job is not the user identified in step S100, the authentication job is counted as a job that is concealed from the user identified in step S100.

In step S104, the display control unit 42 determines whether or not the jobs counted in step S102 include only concealed jobs. If the jobs counted include only concealed jobs, the flow proceeds to step S106. If the jobs counted include not only concealed jobs, the flow proceeds to step S108.

In step S106, the display control unit 42 displays the number of concealed jobs counted in step S102.

In step S108, the display control unit 42 obtains the details of a job that has been memorized by the job memory unit 32 and that is not concealed.

In step S110, the display control unit 42 displays the details of a job that is not concealed, which have been obtained in step S108 and the number of jobs counted in step S102. Note that, as the number of jobs, the number of concealed jobs or the total number of jobs counting the number of concealed jobs is displayed, for example, as illustrated in FIG. 4.

Next, control performed by the operation control unit 44 is described.

Figure 8:
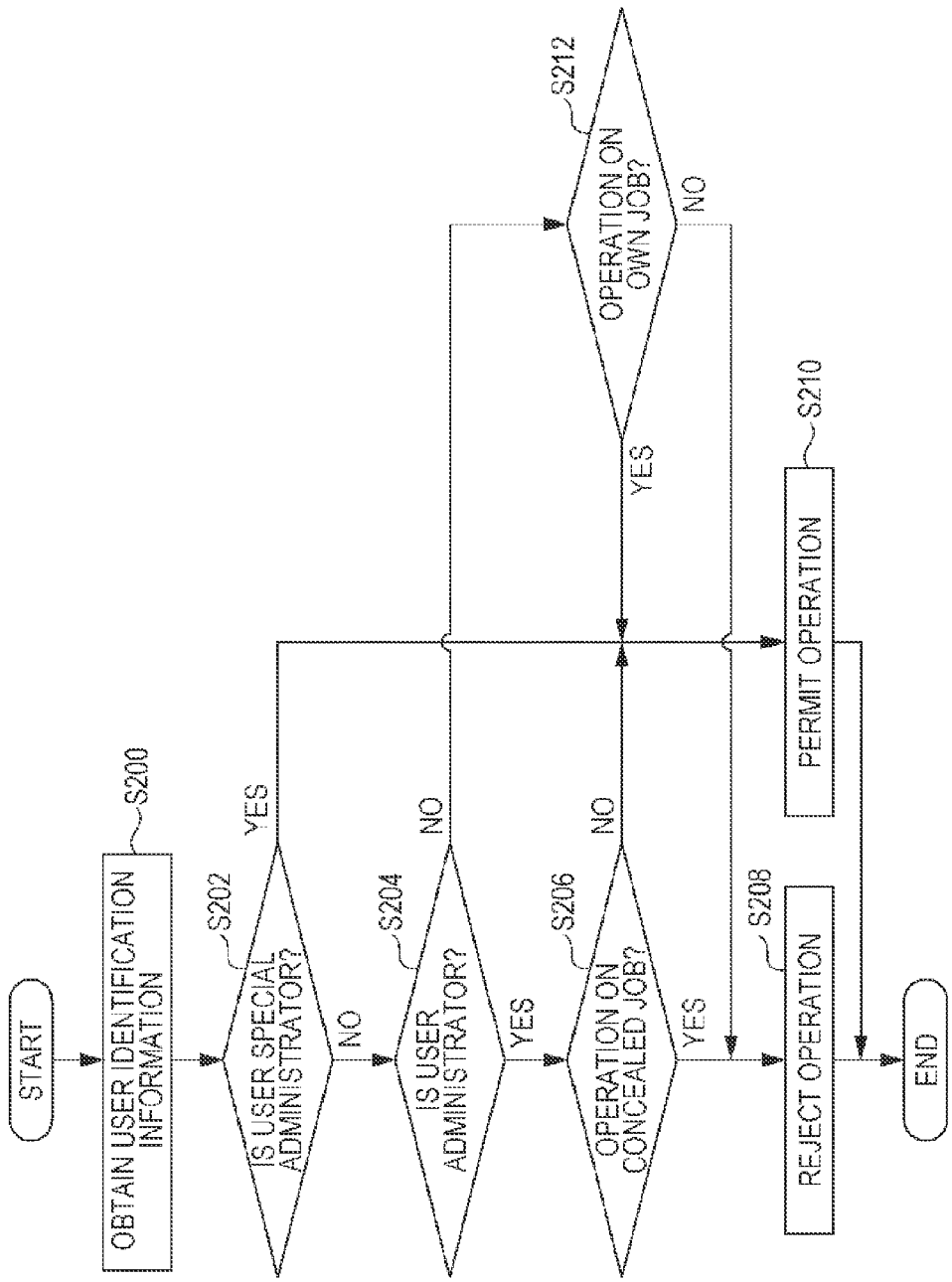
FIG. 8 is a flowchart illustrating an example of control operations performed by an operation control unit.

FIG. 8 is a flowchart illustrating an example of control operations performed by the operation control unit 44.

In step S200, the user identification unit 40 identifies a user who performs an operation on a job by obtaining identification information of the user via the input/output device 22.

In step S202, the user identification unit 40 determines whether or not the user identified in step S200 is a special administrator. If the user identified in step S200 is a special administrator, the flow proceeds to step S210 and the operation on a job is permitted. If the user identified in step S200 is not a special administrator, the flow proceeds to step S204.

In step S204, the user identification unit 40 determines whether or not the user identified in step S200 is an administrator. If the user identified in step S200 is an administrator, the flow proceeds to step S206. If the user identified in step S200 is not an administrator, the flow proceeds to step S212.

In step S206, the operation control unit 44 determines whether or not an operation to be performed on an operation target job is an operation on a job that is concealed from the user identified in step S200. If an operation is to be performed on an operation target job that is concealed from the user identified in step S200, the flow proceeds to step S208. If an operation is to be performed on an operation target job that is not concealed from the user identified in step S200, the flow proceeds to step S210.

In step S208, the operation control unit 44 performs control so as to reject the operation to be performed on the operation target job by the user identified in step S200.

In step S210, the operation control unit 44 performs control so as to permit the operation to be performed on the operation target job by the user identified in step S200.

In the case where the user identification unit 40 determines in step S204 that the user identified in step S200 is not an administrator but a general user, the operation control unit 44 determines in step S212 whether or not an operation to be performed on an operation target job is an operation on a job, the owner of which is the user identified in step S200. If an operation to be performed on an operation target job is an operation on a job, the owner of which is the user identified in step S200, that is, if an operation to be performed on an operation target job is an operation to be performed by a user associated with the operation target job, the flow proceeds to step S210 and the operation is permitted. If an operation to be performed on an operation target job is an operation on a job, the owner of which is a user other than the user identified in step S200, the flow proceeds to step S208 and the operation is rejected.

As described above, the operation control unit 44 performs control so as not to permit an administrator, who is a predetermined user, to perform an operation on a job that is concealed and so as to permit an administrator to perform an operation on a job that is not concealed.

The exemplary embodiment of the present invention has been described above. It may be configured not to indicate the presence of an authentication job to general users. For example, in the case where a viewer is a general user, it may be configured to display a management screen as illustrated in FIG. 6B and, in the case where a viewer is an administrator, it may be configured to display a management screen as illustrated in FIG. 4. The display control unit 42 may be configured to indicate the presence of a concealed job when the storage capacity of the storage device 18 decreases to a predetermined capacity or below. Furthermore, the job memory unit 32 may be configured to automatically delete a memorized job after a predetermined period of time has elapsed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a local memory that stores pieces of processing information in a folder, the pieces of processing information including one or more authentication jobs that are print jobs set by an owner as authentication jobs so that the print jobs are concealed from users other than the owner, and one or more general jobs that are not set by the owner to be concealed from any user, the general jobs and authentication jobs being mixed together in the folder; and
at least one central processing unit (CPU) configured to:
perform control, for a general job stored in local memory, and for an authentication job stored in the local memory that is not concealed from a given user, to display details of the piece of processing information of the job on a display, and
perform control, for an authentication job stored in the local memory that is concealed from a given user, to not display details of the piece of processing information of the job but to indicate a presence of the piece of processing information of the job on the display,
wherein the at least one CPU receives a request to delete a piece of processing information of an authentication job that is stored in the local memory and that is selected by a first user, and deletes the piece of processing information of the authentication job from the folder even if the piece of processing information of the authentication job is concealed by a second user so as not to be displayed to the first user, while maintaining in the folder the one or more pieces of processing information of general jobs that are not concealed.

2. The information processing apparatus according to claim 1, wherein:
the at least one CPU deletes the piece of processing information according to the received request.

3. The information processing apparatus according to claim 1, wherein
the at least one CPU performs control, for a piece of processing information stored in the local memory and that is concealed, to not display a name of an owner of the concealed processing information but to indicate a presence of the piece of processing information on the display.

4. The information processing apparatus according to claim 1, wherein
the at least one CPU performs control, for a piece of processing information stored in the local memory and that is concealed, to not display a job name of the concealed processing information but to indicate a presence of the piece of processing information on the display.

5. The information processing apparatus according to claim 1, wherein
the at least one CPU receives a request to automatically delete a piece of processing information stored in the local memory, including both concealed and non-concealed pieces, after a period of time has elapsed.

6. The information processing apparatus according to claim 2, wherein
the at least one CPU receives a request to automatically delete a piece of processing information stored in the local memory, including both concealed and non-concealed pieces, after a period of time has elapsed.

7. A print job processing apparatus comprising:
a local memory that stores a plurality of print jobs in a folder, the print jobs including one or more authentication jobs and one or more general jobs mixed together in the folder, the authentication jobs being print jobs set by an owner as authentication jobs so that the print jobs are concealed from users other than the owner, and the general jobs being not set by the owner to be concealed from any user; and
at least one CPU that is in communication with the local memory and that is configured to:
perform control, for a general job stored in local memory, and for an authentication job stored in the local memory that is not concealed from a given user, to display details of the job on a display, and
perform control, for an authentication job stored in the local memory that is concealed from a given user, to not display details of the job but to indicate a presence of the job on the display,
wherein the at least one CPU receives a request to delete an authentication job that is stored in the folder in the local memory and that is selected by a root user, and deletes the authentication job from the folder, while maintaining the one or more general jobs in the folder.

8. An image processing system comprising:
a local memory that stores pieces of processing information in a folder, the pieces of processing information including authentication jobs that are print jobs set by an owner as authentication jobs so that the print jobs are concealed from users other than the owner, and one or more general jobs that are not set by the owner to be concealed from any user, the general jobs and authentication jobs being mixed together in the folder;
an image processing apparatus comprising:
at least one central processing unit (CPU) in communication with the local memory and configured to:
perform control, for a general job stored in local memory, and for an authentication job stored in the local memory that is not concealed from a given user, to display details of the piece of processing information of the job on a display,
perform control, for an authentication job stored in the local memory that is concealed from a given user, to not display details of the piece of processing information of the job but to indicate a presence of the piece of processing information of the job on the display, and receive a request to delete a piece of processing information of an authentication job that is stored in the local memory and that is selected by a root user;

a terminal apparatus that is connected to the image processing apparatus via a network and that deletes from the folder the piece of processing information of the authentication job even if the piece of processing information of the authentication job is concealed so as not to display details of the piece of processing information of the authentication job to other non-root users, while maintaining in the folder the one or more pieces of processing information of general jobs that are not concealed; and an image forming apparatus that outputs on a sheet an image based on a piece of processing information stored in the local memory.

9. The information processing apparatus according to claim 1, wherein the at least one CPU further performs control, for a piece of processing information stored in the local memory and that is concealed, to display details of both concealed and not concealed pieces of processing information on the display, for the first user.

10. The information processing apparatus according to claim 1, wherein the first user has higher access privileges than the second user.

11. The print job processing apparatus according to claim 7, wherein the root user has higher access privileges than a non-root user.

12. The print job processing apparatus according to claim 7, wherein the at least one attribute is a name of an owner of the print job.

13. The print job processing apparatus according to claim 7, wherein the at least one attribute is a job name of the print job.

14. The information processing apparatus according to claim 1, wherein the at least one CPU determines whether a storage capacity of the local memory is less than a threshold capacity, and performs control to indicate the presence of the concealed processing information if the storage capacity is less than or equal to the threshold capacity.

15. The print job processing apparatus according to claim 7, wherein the at least one CPU determines whether a storage capacity of the local memory is less than a threshold capacity, and performs control to indicate the presence of the concealed print job if the storage capacity is less than or equal to the threshold capacity.

16. The image processing system according to claim 8, wherein the at least one CPU determines whether a storage capacity of the local memory is less than a threshold capacity, and performs control to indicate the presence of the concealed processing information if the storage capacity is less than or equal to the threshold capacity.

* * * * *